May 12, 1953 — E. P. SCHOCH — 2,638,443
METHOD AND APPARATUS FOR GLOW DISCHARGE TREATMENT OF GASES
Filed Oct. 17, 1947

Eugene P. Schoch
INVENTOR

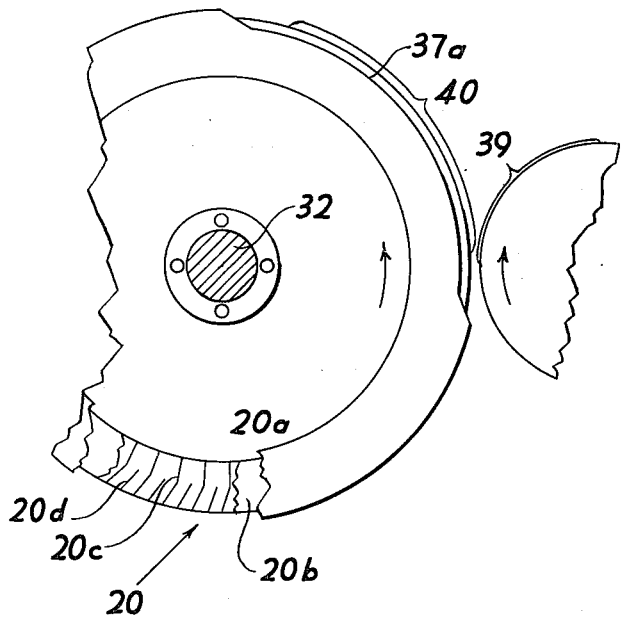
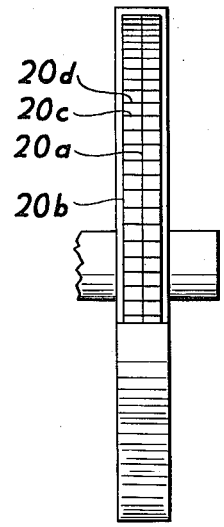
Fig. 4          Fig. 5
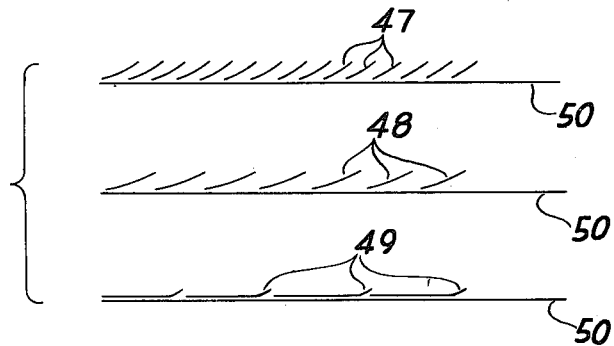
Fig. 6a
Eugene P. Schoch
INVENTOR Eugene P. Schoch
INVENTOR

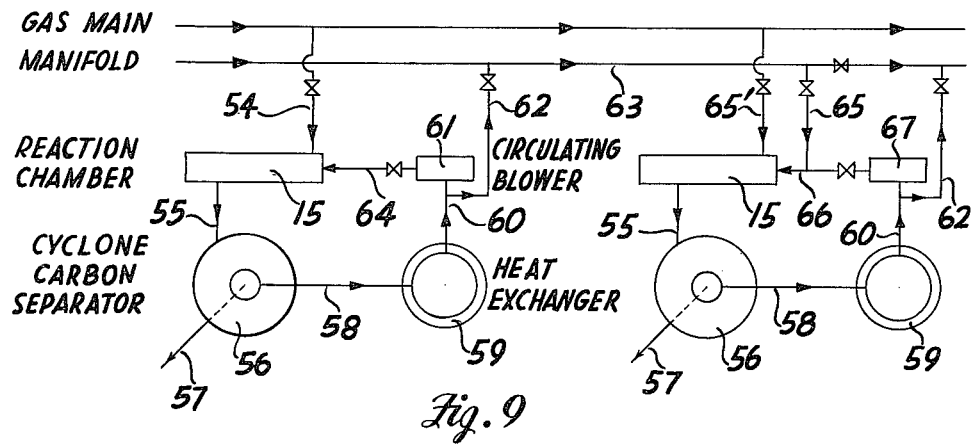
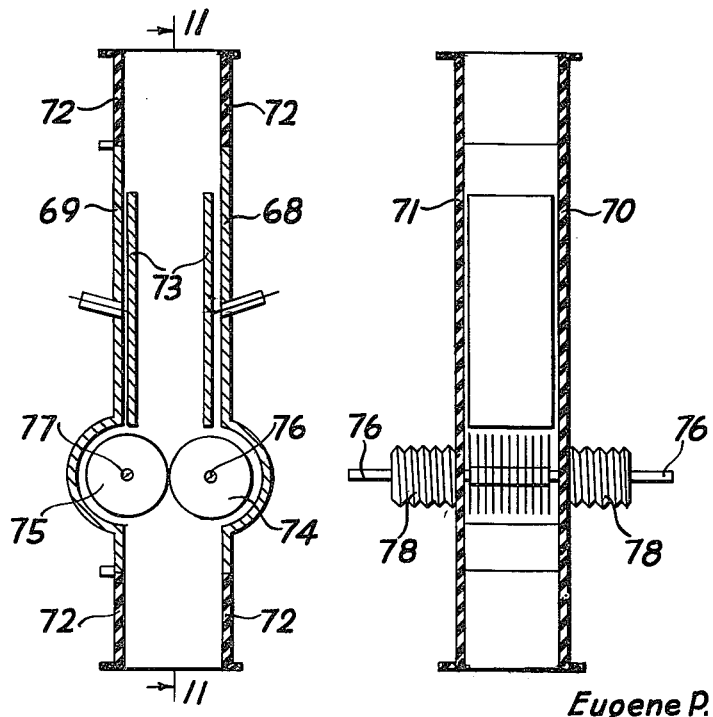

Patented May 12, 1953

2,638,443

UNITED STATES PATENT OFFICE 2,638,443

METHOD AND APPARATUS FOR GLOW DISCHARGE TREATMENT OF GASES

Eugene P. Schoch, Austin, Tex., assignor to The Board of Regents of The University of Texas Application October 17, 1947, Serial No. 780,428

17 Claims. (Cl. 204—171)

This invention relates to improvements in methods and apparatus for producing electric glow discharges and for treating gases therewith.

This application is a continuation in part of my co-pending application, Serial Number 447,998, filed June 22, 1942, now abandoned, entitled "Method of and Apparatus for Producing Acetylene."

Heretofore electric discharges have been employed to induce chemical reactions in gas. However, the only discharges that have been commercially usable at pressures above .75 atmosphere have been the dark discharge and the arc discharge. For example, the dark discharge has been employed in the ozonizer. The arc discharge has been employed somewhat more extensively for instance in the production of acetylene from hydrocarbon gases by the Germans and in the production of nitric oxide from air.

Both the dark and arc discharges are limited in their application. The use of the dark discharge is limited by the low amount of current that may be employed and the application of the arc discharge is limited by the extremely high temperatures that result from the arc. In fact it is usually these high temperatures that are relied upon to induce the chemical reactions thermically when the arc is employed.

The glow discharge is well recognized by the art and when used at reduced pressures, in the neighborhood of 1 mm. Hg has been employed upon a large commercial scale in neon lighting. However, heretofore the glow discharge has been produced at pressures above .75 atmosphere only under very special conditions employing direct current with either very low amperage or minute electrode distances. In addition the glow discharge has been difficult to maintain continuously and for these reasons this discharge has not had commercial application at pressures above .75 atmosphere.

The glow discharge, except at reduced pressure, has heretofore been produced only with direct currents. Obviously the ready availability and ease of control of alternating currents make it desirable to employ those currents when the glow discharge is to be employed commercially.

An object of this invention is to provide a method for producing electric glow discharges in non-explosive gases composed of polyatomic molecules under pressures above .75 atmosphere involving substantial electric discharge energy rates. Wherever the word gas is used in this specification, it is used to designate non-explosive gases composed of polyatomic molecules.

Another object is to provide apparatus in which an electric glow discharge may be initiated and maintained in gas at pressures above .75 atmosphere involving substantial electric discharge energy rates and wherein substantial quantities of gas may be passed through the discharge.

A further object is to provide a method and apparatus for treating gas at a pressure above .75 atmosphere with an electric glow discharge for producing chemical reactions wherein the reaction products are not deleteriously effected by these discharge conditions.

Still another object is to provide a method and apparatus for treating gas at a pressure above .75 atmosphere with an electric glow discharge wherein the gas may be repeatedly passed through the discharge to build up a desirable concentration of reaction products.

A still further object is to provide a novel electrode in the form of a blower or impeller which is useful in initiating and maintaining an electric glow discharge in gas at pressures above .75 atmosphere.

Yet another object is to provide a method and apparatus for treating gas to induce chemical reactions therein of the type characterized by being initiated by (endothermic) activation of at least one constituent of the gas wherein the gas to be treated is forced between bare electrodes energized to an extent to produce an arc discharge therebetween were the gas not agitated, at such a flow rate as to result in a glow discharge between the electrodes.

Other and further objects of this invention will appear as the description of the invention proceeds.

In general this invention is concerned with the production of a glow discharge in gas at pressures between .75 atmosphere and 3 atmospheres under such conditions that the discharge lends itself to the treatment of gas to produce chemical reactions therein of the type characterized by being initiated by (endothermic) activation of at least one constituent of the gas. In producing the discharge bare or uninsulated electrode surfaces are employed and in accordance with this invention may be energized either by D. C. or A. C. current, the latter being preferred. A special means is provided for initiating the discharge when it becomes broken. The degree of energization of the electrodes is such that an arc would result across the electrodes if a discharge took place in a quiet atmosphere. In order to produce the glow discharge and also to subject the gas to be treated to the discharge, portions of the gas are continuously blown through the discharge space between the electrodes at a very high rate. This flow is also conducted in such manner that the rate of flow of gas throughout the discharge space is substantially uniform. In order to build up the desired concentration of reaction products the gas may be continuously and repeatedly passed through the discharge space because the discharge conditions are such that the reaction products already formed, when passed repeatedly through the discharge, are not deleteriously affected for practical purposes.

In the accompanying drawings which form a part of the instant specification and are to be read in conjunction therewith and wherein like reference numerals are used to indicate like parts in the various views:

Fig. 4 is a fragmentary enlarged side elevational view of the electrodes and a sheath shown in Fig. 3 and constituting a preferred embodiment of electrodes in accordance with this invention;

Fig. 5 is a peripheral elevation of the electrode shown in Fig. 4;

Fig. 6a shows a series of oscillograms obtained from an operation with D. C. of the apparatus shown in Figs. 3 to 5 inclusive;

Fig. 9 is a flow diagram illustrating the continuous operation of a series of discharge chambers shown in Fig. 3 together with the necessary accessory apparatus;

Fig. 10 is a sectional view illustrating a modified form of apparatus in accordance with this invention; and Fig. 11 is a view taken along the line 11—11 in Fig. 10 in the direction of the arrows.

Figure 1:
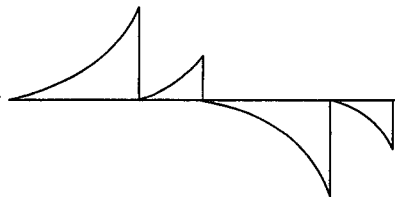
Fig. 1 is an oscillogram obtained from an electric glow discharge with A. C. in accordance with this invention and is characteristic of such discharges generally.
Figure 2:
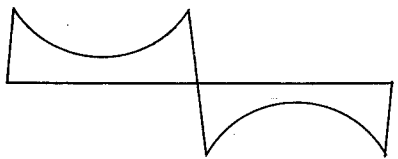
Fig. 2 is an oscillogram obtained from an electric arc discharge with A. C.

Referring to the drawings, more particularly to the oscillograms of Figs. 1 and 2, the glow discharge will be discussed to facilitate an understanding of the accepted term "glow discharge" as used herein and in the appended claims. These oscillograms are identical to the top and bottom curves of Fig. 7 and the manner in which the oscillograms were obtained will be hereinafter more fully explained in connection with Figure 7 but it is here stated, that they were obtained with an A. C. energy source. The arc discharge oscillogram of Fig. 2 is characterized by the initial decrease in voltage (i. e. an increase in conductivity). The oscillogram of the glow discharge on the other hand is characterized by the constant increase of voltage until a peak is reached. The characteristic initial decrease of the voltage in an arc is considered to be due to the thermal action of the arc producing energized particles in the discharge path. The rise of the arc curve in the last half of the semi-cycle is believed to be largely due to the decrease of current, as will be readily understood by a mental imposition of a semi-cycle of the sine wave of the current over the semi-cycle of the voltage wave. The contrasting steady voltage rise of the glow discharge is characteristic of this discharge and clearly distinguishes it from the arc. Therefore it will be seen that the term "glow discharge" refers to the discharge which has this characteristic continuous voltage increase as shown by an oscillogram. In the oscillogram of Fig. 1 there are two peaks to each semi-cycle. This particular oscillogram is shown by way of illustration and not in a limiting sense. It is to be understood that the oscillogram may show as many as five or more peaks to each semi-cycle and there may be only one peak. With a D. C. energy source the glow oscillogram is comparable but all the peaks are of course upon one side of the line. On the other hand the arc discharge obtained when using D. C. is a horizontal line. The glow discharge is well known in the art and is disclosed for example by Thoma and Heer in "Zeitsch. f. techn. Physik" volume 13 (1932), page 464 and by Hsu Yun Fan in "Physical Review," volume 55 (1939), page 769.

It is believed that an understanding of the invention will be facilitated by reference at this time to the preferred apparatus for carrying out the invention. The apparatus may be employed for treating gases at pressures above .75 atmosphere and has been partially successfully used with pressures up to 250 pounds per square inch gauge but it is preferred to operate at pressures between .75 atmosphere and 3 atmospheres. The apparatus may be used to initiate and maintain a glow discharge in any gas as defined above and will induce desirable chemical reactions of the type characterized by being initiated by (endothermic) activation of at least one constituent of the gas. Usually these products of activation will react outside the discharge path to form the final reaction product. This secondary reaction is exothermic. To illustrate, chemical reactions may be produced in hydrocarbons, carbon dioxide, air, as well as in mixtures of hydrocarbons with hydrogen, nitrogen, carbon dioxide, or hydrogen sulphide. However, in the interest of simplicity the apparatus will be explained in connection with its use in the treatment of methane to form acetylene and carbon black, but this is done by way of illustration and not in a limiting sense.

When electric discharges are passed through methane under pressures ranging from 40 to 100 mm., acetylene is produced with energy efficiencies of 30% to 50% and together with only a small amount of carbon (about ⅕ of the acetylene by weight) as long as the intensity of the discharge is maintained below a certain limit, which limit decreases as the pressure increases. "Intensity of the Discharge" is the ratio of the discharge energy to the amount of gas in the space actually effected by the discharge—and since it has been proven by calculations with experimental results made under various gas pressures, that the discharge intensity to produce acetylene together with the least amount of carbon varies inversely as the 1.6 power of the pressure—we obtain the following formula:

Discharge intensity to produce acetylene together with the least amount of carbon, a constant = divided by the gas pressure raised to the 1.6 power.

The value of 1.6 for the exponent of the gas pressure was obtained by considering both the data obtained with reduced pressures, as well as the recent data obtained with atmospheric pressure. In order to change from operating with gas pressures of about 7.6 cm. to pressures of 1 atm. (i. e. 76 cm.), the discharge intensity has to be reduced to one-fortieth of the above value (for 76 cm.) because $(1/10)^{1.6} = 1/39.8$. The numerical value of this discharge intensity calculated at a pressure of 76 cm. Hg (1 atm.) becomes .0005877 kwh. per 1 cu. ft. of gas. (Note.—The reciprocal of this value is 1705 cu. ft. per 1 kwh.) This value of the discharge intensity corresponds to an energy efficiency of 37% (Note.—Calculated with the above formula from experiments made under 100 mm. Hg, producing acetylene from methane.), while an efficiency of 36% was obtained in this case (in experiments making acetylene from methane under a pressure of one atmosphere.)

Figure 3:
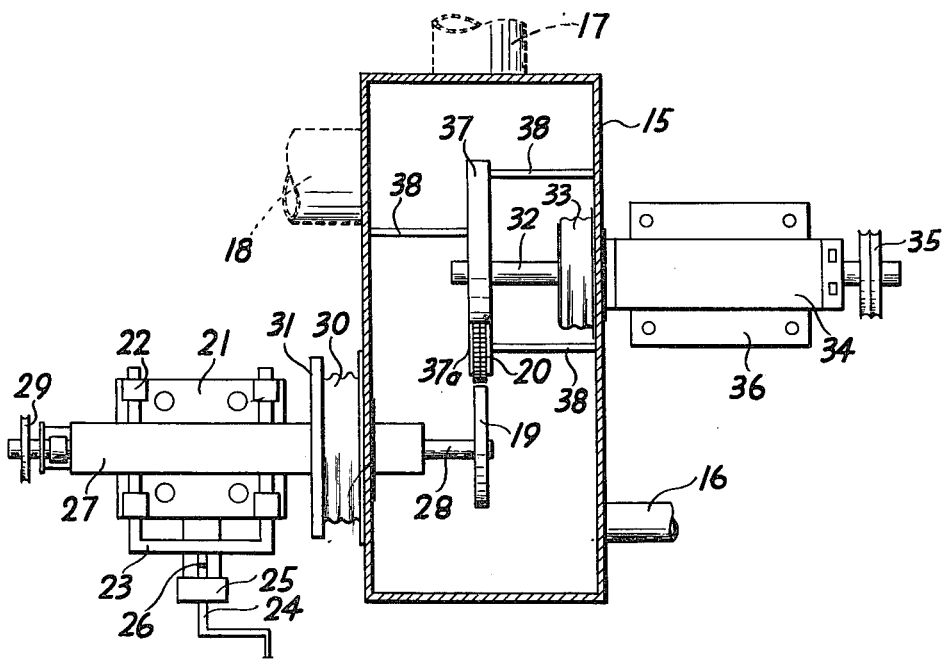
Fig. 3 is a schematic plan view of apparatus constituting a preferred embodiment of this invention with parts broken away for clarity.

Referring to the apparatus disclosed in Figs. 3 to 5 inclusive the numeral 15 designates a casing which has a cover not shown in the drawings. The casing provides the reaction chamber and has an inlet 16 through which gas to be treated may be introduced into the casing. When the apparatus is employed in a batch process, fitting 16 may be used to withdraw the gas from the casing after the operation has been completed. When operating on the batch process the materials of the apparatus serve efficiently to absorb the small heat that is generated during the treatment of a single batch. However, when a continuous operation is to be performed, as will be hereinafter more fully described in conjunction with Fig. 9, a portion of the gas is continually withdrawn through fitting 17 shown in dotted line, circulated through a cooler and carbon separator and at least a portion thereof reintroduced into the casing through fitting 18 also shown in dotted lines.

Within casing 15 electrodes 19 and 20 are mounted for rotation. Electrode 19 may be a solid wheel and its mounting is such as to provide for adjustment of the distance between the peripheries of the two electrodes. This mounting includes a base 21 having ears 22 which slidably support yoke 23. Means are provided for selectively sliding the yoke within the ears and may be in the form of a crank shaft 24 having a threaded connection within an upright support 25 carried by the base. The crank has a universal connection 26 with the yoke so that rotation of the crank advances or retracts the yoke arms in guides 22 dependent upon the direction of rotation of the shaft. A case 27 is supported by rigid connections upon the yoke arms and carries suitable bearings not shown in the drawings in which shaft 28 is journaled. Shaft 28 is connected at one end to electrode 19 and at the other end carries a pulley wheel 29 adapted to be rotated by a suitable V-belt and prime mover not shown in the drawings. Housing 27 and shaft 28 extend through a bellows 30 and insulation block 31 carried by the bellows. The bellows and insulation block provide a seal about the shaft and housing and the flexibility of the bellows permit lateral movement of the shaft and housing to adjust the peripheral distance between electrodes 19 and 20.

The mounting of electrode 20 is somewhat similar to that of electrode 19 but no provision is made for lateral adjustment of the shaft 32 upon which the electrode is secured. Shaft 32 extends within bellows 33 and housing 34. The shaft is journaled in suitable bearings carried by housing 34 and at its end remote from the electrode carries a double pulley wheel 35 which may be driven by a suitable V-belt and prime mover connection. Housing 34 is secured to base 36. Of course the seal for shaft 32 is provided by the bellows and by insulation carried internally of the bellows.

Shafts 32 and 28 may be connected to a suitable source of electrical energy in any manner as will be well understood by those skilled in the art. The source of energy is not shown in the interest of simplicity but may be either direct or alternating current. Due to the simplicity of control and also the ready availability of alternating current this energy source is preferred for operation with this apparatus.

Electrode 20 is substantially cylindrical in shape and is constructed in the form of a centrifugal impeller or blower. The electrode is made up of a central disc 20a and two side rings 20b, together with a series of transverse blades 20c and 20d. However, making all the blades alike and like 20c is preferable. The disc 20a is secured to shaft 32 and supports the remainder of the electrode thereon. This mounting includes a hub which is an integral part of disc 20a and is keyed to shaft 32.

The arrangement of disc, rings and blades is such as to provide a peripheral surface that may be described as grid-like having a series of openings connected by passages to openings interior of the periphery of the electrode. It will be noted that the blades 20c are of longer length than are the blades 20d. Each of the blades 20c are dog-leg having a portion extending radially and their outer portion extending at an angle at approximately 15 degrees to the radii. Each of the blades 20d extend at the same angle of 15 degrees to the radii.

Preferably a sheath 37 surrounds the electrode 20. This sheath is not secured to the electrode which is free to rotate within the sheath and the sheath is secured to casing 15 by suitable brackets 38. Sheath 37 has an opening 37a upon its periphery which exposes a portion of the periphery of the electrode.

This opening 37a is located adjacent electrode 19 so that the gas within the reaction chamber is continuously blown through the discharge space between the electrodes. The sheath is not a necessary part of the apparatus but adds to the efficiency of operation inasmuch as it reduces the energy required for rotating the blower electrode. Obviously this performs this function without in any way interfering with the flow of gas through the discharge space proper between the electrodes.

The effective electrode surface of each of the electrodes 19 and 20 is shown by the brackets 39 and 40 respectively in Fig. 4. It will be seen that these electrode surfaces are diverging. These electrode surfaces have portions of closest and equidistant proximity of substantial length. This shortest distance between the surfaces serves as a means for initiating the discharge break-through when predetermined current and voltage operating conditions are employed. Thus, the distance between the electrodes at their points of closest proximity are adjusted in accordance with well-known practice. For instance with an electrode distance of approximately $\frac{1}{16}$ inch a voltage of about 8,000 is required. As heretofore explained with this apparatus the electrode distance may be readily adjusted.

Once the discharge is initiated, it is carried along by the rotating electrodes and stretches measurably. The space between the electrodes is seen to be "filled" with discharge. Also the discharge path is blown outwardly in the direction of divergence by the flow of gas through the discharge space. Finally when the discharge has been stretched to approximately the limits indicated on Fig. 4 by the brackets 39 and 40 the discharge is broken and is reinitiated back at the points of closest approach of the electrodes. With the arrangement of the impeller electrode it will be seen that gas is continually being blown into the discharge space not only at the point of break-through but additional portions of gas are blown into the space along one of the electrode surfaces, namely the impeller. This arrangement is such that the flow of gas throughout the entire discharge space is nearly uniform.

Referring again to the character of the electrode surfaces, they may be described in different language as being divergent electrode surfaces having points upon each electrode surface included in a line transverse to the divergency and being substantially equidistant from the points of nearest approach of the other electrode surface. The shortest distance between the electrodes of course serves as the initiating means for establishing the break-through of the discharge.

If it is desired to increase the flow through the initial discharge it is contemplated that the distance between the electrodes at the initiating point and the break-through may be materially lengthened by imposing a high frequency high voltage low current discharge across the electrodes. This high frequency current will break through the discharge gap and cause sufficient ionization of the gas passing through the discharge gap to permit the establishment of the glow discharge of the main current.

It is important in the construction of the blower electrode, in order for the blow to be most effective that the gas be blown through the space between the electrodes and reach as closely as possible the effective discharge surface of the blower electrode. To accomplish this the thicknesses of the rings 20b, discs 20a and blades 20c and 20d must be as small as possible. However, experience has shown that from the standpoint of durability their thickness should be as large as possible. Ring, disc and blade thicknesses of .140 inch have been found entirely satisfactory, but this represents an example rather than a limitation.

To secure the best results with the impeller electrode and to uniformly distribute the wear over the electrode surfaces of both electrodes, cylindrical electrode surfaces are preferred with their axes placed parallel. The diameter of the impeller electrode and counter-electrode 19 may be varied over a wide range and need not be equal. For the counter-electrode the diameter may range between 3 inches and 18 inches and even greater. The diameter of the blower electrode will preferably range between 10 inches and 40 inches or greater. Electrode 19 may be replaced with a flat disc rotating on an axle placed at right angles to the axle of the blower and so arranged that the peripheral electrode surface of the blower is spaced from and is parallel to one side surface of the disc.

The impeller electrode need not be perferctly cylindrical but should not depart sufficiently therefrom to produce an uneven gas pressure over the blowing surface. The line of nearest approach of the impeller electrode to the counter electrode should always be substantially equidistant at all points.

The counter-electrode need not necessarily be a rotatable electrode but some provision must be made for cooling it. This may be most readily accomplished by using a rotatable electrode whereby the wear, heat and electron bombardment may be readily distributed over a large area.

In operating the apparatus of Fig. 3 the counter-electrode 19 is preferably rotated in order to reduce the wear upon any particular portion of the electrode. The speed of rotation of the electrode 19 is relatively unimportant. This electrode may also be of the impeller type but in the interest of economy the simpler form of the solid wheel is preferred. Electrode 20 on the other hand is relied upon to blow the gas to be treated through the electric discharge path at a very high flow rate. Thus, its rotation must be sufficiently rapid to blow enough gas through the discharge regions between the electrodes to initiate and maintain the glow discharge.

Pitot tubes may be used to test the actual flow rate of gas passing through the discharge space. There is a critical flow rate, with constant pressure and electric energy discharge rate at which the gas must be blown through the discharge space in order to maintain the glow discharge as distinguished from an arc. This has been found to be true in the case of discharges in all gases tried, such as for example methane, air, carbon dioxide, mixtures of such gases and the like. The particular constituents of the gaseous medium treated affects the flow rate requirement.

The observations of the critical speed of rotation with any gas may be made by direct observation or preferably by the use of the oscilloscope. These observations may also be made by means of voltage measurements between the electrodes as it has been found that there is straight line relationship between the voltage drop across the electrodes and the rate of flow of gas between the electrodes in the glow discharge. On the other hand, this relationship in the case of the arc discharge is irregular.

The critical rate of flow of gas between the electrodes varies with the operational conditions, i. e. pressure of the gas and the electric discharge energy rate, and to some extent the particular gas employed. However, the critical rate of flow has a definite value when other operational conditions are maintained constant.

A critical rate of flow for given operational conditions may be determined by use of the oscillograph in the manner now to be described. Using the apparatus of Fig. 3 electrode 20 was selected as an impeller having a diameter of 20 inches, width 2¼ inches with 6 circumferential rows of 77 holes or passages instead of the two row electrode shown in the drawings. The peripheral openings are each ¼ inch wide and have ¾ inch peripheral lengths. All of the blades are of the type shown at 20d and have a depth of ¾ inch and are placed at an angle of 15 degrees to the radii. The electrode 19 was a flat pulley wheel having a diameter of 10⅝ inches with a width of 2¾ inches. These electrodes were operated in a fixed volume of natural gas, the initial impeller speed of rotation being 2700 R. P. M., the solid electrode speed 2,000 R. P. M. 2400 volts were applied between the electrodes with 60 cycle per second alternating current of 21.5 amps. The oscillogram 41 of Fig. 6 was obtained at the commencement of operations. The power to the motors driving the electrode was then cut off and the rotors allowed to coast to a standstill. With an impeller electrode rotation of 2,000 R. P. M. oscillogram 42 was obtained. The electrode 19 came to a standstill while the impeller electrode was turning at 1700 R. P. M. causing no apparent change in the voltage or other characteristic of the discharge. Oscillograms 43, 44 and 45 were made at impeller electrode speeds of 1100 R. P. M., 800 R. P. M., and 200 R. P. M., respectively. While this experiment was conducted voltage readings were also taken at various R. P. M. and plotted in curve 46 of Fig. 7.

Figure 6:
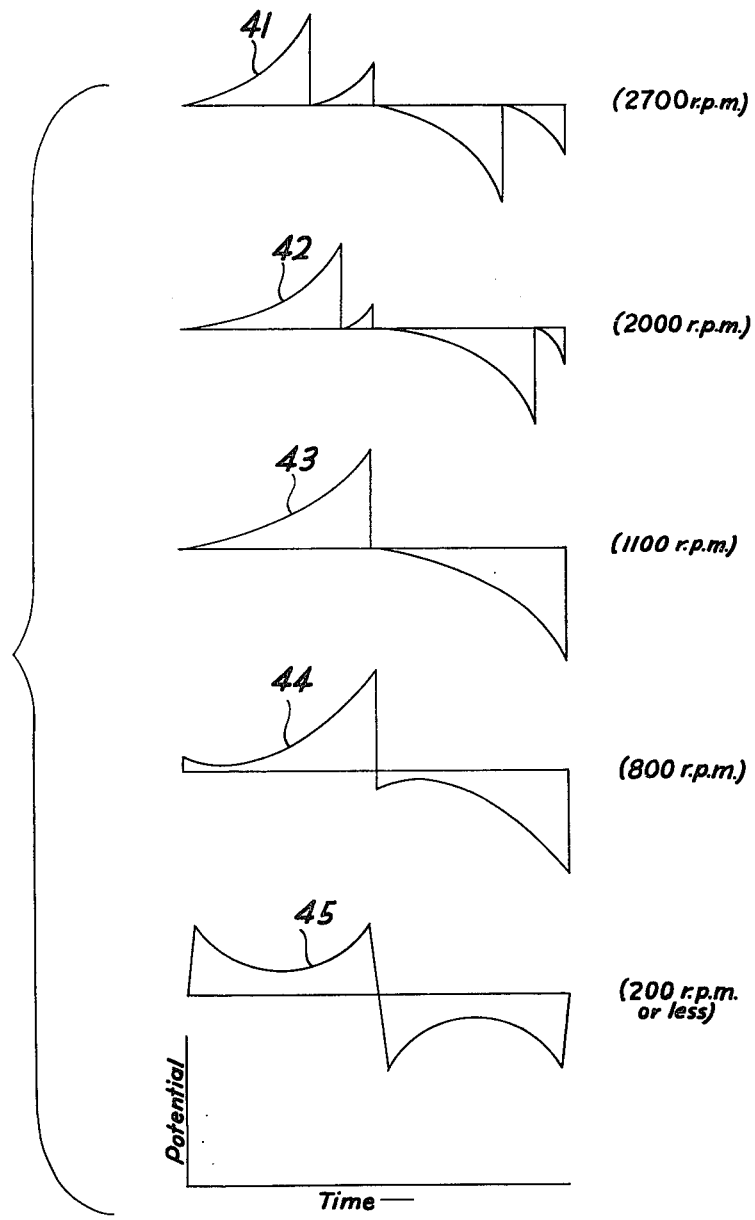
Fig. 6 shows a series of oscillograms obtained from an operation with A. C. of the apparatus shown in Figs. 3 to 5, inclusive.

Curves 41 to 43 of Fig. 6 are all characteristic of the glow discharge while oscillograms 44 and 45 are characteristic of the arc discharge. These oscillograms illustrate the critical rate of flow of gas as being obtained with impeller electrode rotational speeds of 1100 R. P. M. or above and provide a suitable method for arriving at a proper rotational speed for the blower electrode in order to insure a glow discharge.

Figure 7:
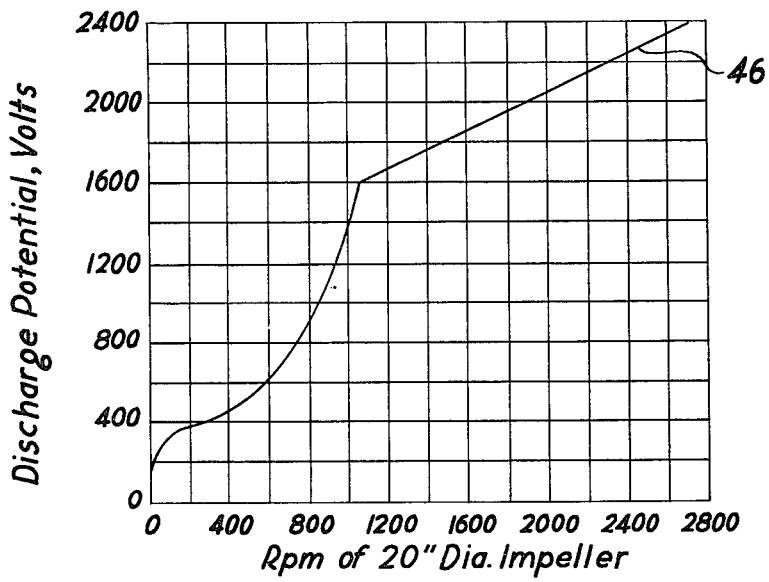
Fig. 7 is a graph based upon operations of the apparatus of Figs. 3 to 5, inclusive, showing the relationship of the discharge potential to the rate of rotation of the blower electrode.

The voltage curve 46 of Fig. 7 discloses a straight line relationship between the R. P. M. of the impeller electrode and the discharge potential between the electrodes when the impeller was rotated at rates above approximately 1,050 R. P. M. On the other hand as the rotation is decreased from 1,050 R. P. M., the voltage drop decreases much more rapidly and irregularly. To obtain the glow discharge the rate of rotation of the impeller should fall within those included within this straight line relationship.

In conducting the above experiments with the oscilloscope the circuit equipment of the apparatus was such as to produce with A. C. an essentially sinusoidal current wave and with any source of current, of substantially constant average amperage irrespective of the length of the discharge path. This control is easily obtained with alternating current by inserting an inductive reactor into the circuit or by using a harmonic or resonating circuit of which there are several forms. The well known T circuit devised by C. P. Steinmetz has proven entirely satisfactory for the purpose. The oscillograms thus obtained show the regular current sine wave and superimposed on it a curve indicating the simultaneous voltage drop between the electrodes. In the drawings the current sine wave curve has been eliminated in the interest of simplicity.

In Fig. 6a there is shown a series of curves 47, 48 and 49 which were obtained by use of the oscilloscope when the apparatus was energized by D. C. produced by rectifying three-phase, 60 cycles per second A. C. In obtaining these curves the electrodes were rotated and then allowed to come to a standstill. The counter-electrode came to a standstill practically immediately and for this reason the R. P. M. of this electrode will not be given. On the other hand the impeller electrode was rotated at 2,000 R. P. M. when curve 47 was obtained, 1200 R. P. M. for curve 48 and 1,000 for curve 49.

The distinctive feature of curves 47 and 48 is that in every instance there is a gradual and continual increase in voltage until the discharge is broken. This is the characteristic of the glow discharge and on the other hand curve 49 which represents an arc shows a straight horizontal line until right at the time of the interruption of the curve. These curve interruptions correspond to interruptions in the actual discharge. In each of the curves 47, 48 and 49 a base or reference line is shown at 50 to clearly illustrate the character of the curve segments.

The quantitative determination of the number of cubic feet of acetylene (measured at one atmosphere and 20° C.) per kwh. of electric discharge energy obtained in the operations of the apparatus just described illustrate the effectiveness of the glow discharge as compared with the arc. To obtain the chemical reaction the gas within the reaction chamber was repeatedly recirculated through the discharge. Portions of the gas were passed through the discharge as many as 100 times. In the table below the results given will be limited to those obtained when the total amount of discharge energy spent upon one cubic foot of natural gas is .05 kwh. which is sufficient to change approximately $\frac{1}{3}$ of the original methane present. In arriving at the data below the current, voltage and R. P. M. were selected at such values as to secure the highest efficiency with the two types of discharge:

| | Speed Above that of Critical Point | Speed Below that of Critical Point |
|---|---|---|
| R. P. M. | 1,500 | 800 |
| Amps | 21.5 | 21.5 |
| Volts | 1,250 | 1,250 |
| Cu. ft. $C_2H_2$/kwh | 2.64 | 2.22 |
| Power Factor | 0.82 | 0.635 |

It is significant from the above table that the cubic feet of acetylene per kwh. produced with the glow discharge is considerably greater than that obtained with the arc discharge even though the arc at this point as shown by the oscillogram curve 44 is near the transition point. Also, the power factor in the glow discharge was materially greater than that of the arc discharge.

These two significant factors were borne out in many operations within wide selections of voltage, amperage and R. P. M. or rate of flow of gas. In accordance with this invention successful operations have been carried on with currents ranging from 2.5 to 40 amps., and in power input from 20 to 140 kw. The latter is not believed to represent an upper limit but rather represents a limitation of apparatus available for these operations. In all of these trials it was found possible to select a ratio of pressure, voltage, current, and rate of flow of gas to produce a glow discharge and an acetylene production per kwh. above 2.6 cubic feet (measured at one atmosphere and 20° C.) and a power factor near or above .8. With the arc discharge the best power factor obtainable was about .6 and ranged downwardly to about .2 with the decrease in R. P. M. of the impeller electrode. The best results obtainable with the arc produced 2.22 cubic feet of acetylene per kwh. and as the rate of rotation is decreased this falls sharply. It was found that with the arc discharge operating with current and power values comparable to those useable in the glow discharge the acetylene energy efficiency is only a small fraction approximately $\frac{1}{3}$ of that obtained with the glow discharge.

Figure 8:
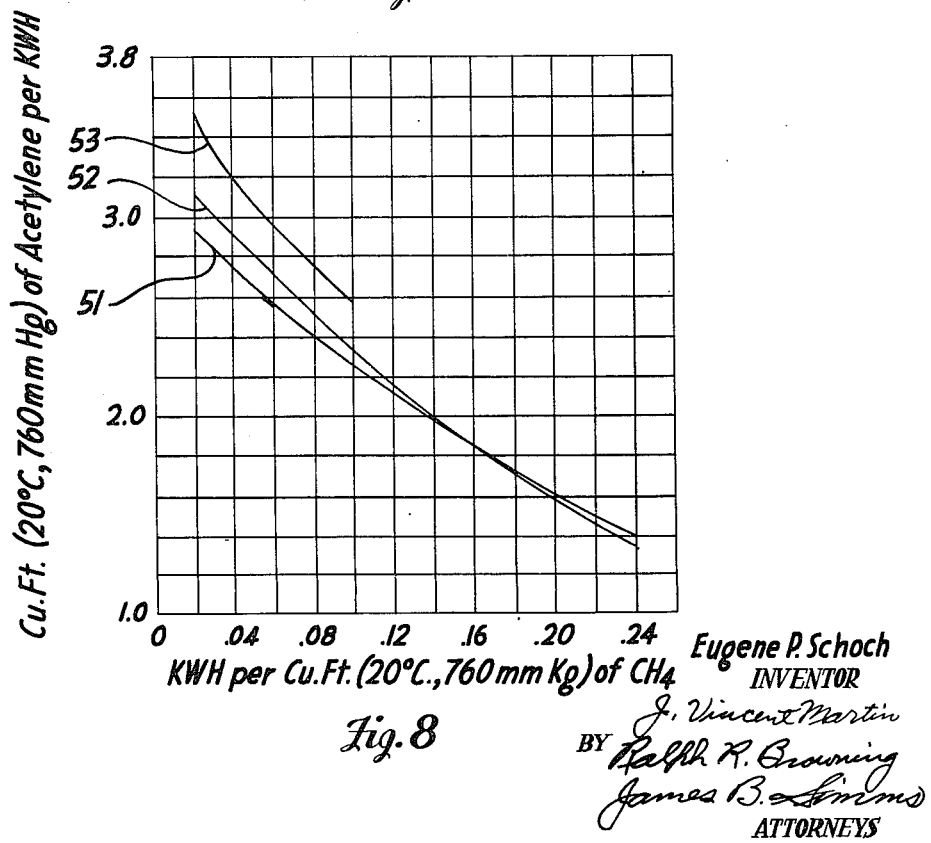
Fig. 8 is a graph illustrating the results obtained in several operations of the apparatus of Figs. 3 to 5, inclusive.

The following are examples of operations in apparatus employing an impeller type electrode:

*Example A.*—The apparatus was generally that shown in Fig. 3. The impeller electrode had a diameter of 10⅝", width 4" and blade or vane depth of ¾". It was rotated counter-clockwise at 4300 R. P. M. The counter-electrode 19 was a flat iron pulley or wheel having a diameter of 10⅝″, face width 4″ and was also rotated at 4300 R. P. M. but in a clockwise direction. The voltage was 2400 A. C. 60 cycles per second current, 32 amps. The gas pressure in the discharge chamber was about 1 atmosphere. The cubic feet of acetylene per kwh. is plotted against kwh. per cubic foot of methane treated in curve 51 of Fig. 8.

*Example B.*—The apparatus was generally that shown in Fig. 3. The impeller dimensions were: diameter 20″; blade depth ¾″; width 3½″; and rate of rotation 2,300 R. P. M. counter-clockwise. Counter-electrode 19 had a diameter of 10⅝″ and face width 4″ and was rotated at 4,000 R. P. M. in clockwise direction. The voltage was 4800 A. C. 60 cycles per second, and the current 12.8 amps. The gas pressure in the discharge chamber was about 1 atmosphere. The results of such operation are plotted in curve 52 of Fig. 8.

*Example C.*—The apparatus was of the same general form. The impeller dimensions were diameter 20″, face width 1 1/16″ and blade depth 2¼″. The impeller was rotated at 3,780 R. P. M. The counter-electrode was a wheel having a diameter of 10½″ and a width of 2″ and was rotated at 2,000 R. P. M. in a clockwise direction. The results obtained are plotted in curve 53 of Fig. 8. The electric energy was 4200 volts, 40 amps. A. C. 60 cycles per second. The gas pressure in the discharge chamber was about 1 atmosphere.

The data of Examples B and C, as well as those given in column 7, lines 64–68 and in the plot of the curve of Fig. 7 will now be used to calculate the respective amounts of gas blown per hour through the discharge spaces in which one kilowatt of electric discharge energy is being expended.

The calculations are confined to these examples because the diameters of their blower electrodes are the same (20″), and hence the results are more directly comparable than would be the case with blowers of different diameters.

*For Example B*

The peripheral velocity of the blower rim, in feet per second, is evidently:

$$\frac{2300}{60}\left(\frac{20\pi}{12}\right) = 200.6$$

The velocity of the gas leaving the surface of the blower with ¾″ blades set at 15° to the radius is shown, in application Serial No. 447,998, to be 0.8 times the peripheral velocity. Hence, here, the gas velocity is 160.5 ft. per sec.

The area of the discharge through which the gas is blown is shown in the same reference to be the product of the length of the open arc across which the discharge is stretched, multiplied by the width of the blower. This area is 15.7×3.5=55 sq. inches. Hence the number of cubic feet per hour blown through the discharge is:

$$160.5\left(\frac{55}{144}\right) \times 3600 = 220688$$

The electric energy rate is evidently:

$$4800(12.8)(0.8) = 49.2 \text{ kilowatt}$$

The power factor, 0.8, used here is obtained from column 10, lines 51–57.

Hence the gas flow per kwh. is $$\frac{220688}{49.2} = 4486 \text{ cu. ft. per kwh.}$$

This figure will be considered further below.

Hereafter only new points will be discussed and, in general, only the results of the calculations will be given.

*For Example C*

Peripheral velocity of blower=330 ft. per sec.

In the calculation of the velocity of the gas coming from the blower, allowance must be made for the difference in the blade depths of this blower and that of Example B. This allowance is calculated with well established laws of mechanics, as follows:

In any blower, the gas pressure on the surface of the rim is proportional to the difference of the squares of the diameters of the outer and inner ends of the blades. For the blower of Example B, we have:

$$20^2 - 18.5^2 = 58$$

For the blower of Example C, we have:

$$20^2 - 15.5^2 = 160$$

The respective blows of these blowers are proportional to these results. Hence the gas velocity from the blower in Example C is $$0.8 \times \frac{160}{58} = 2.21$$

times the peripheral velocity of its rim. Hence, here the gas velocity is $$330 \times 2.21 = 729 \text{ ft. per sec.}$$

The total number of cubic feet per hour blown through the discharge is 303,264.

The electric energy rate is 134.4 kw.

Hence the blow per kwh. is—2257 cu. ft. per kwh.

Reconsideration of the above blow per kwh. obtained for Example B: this blow in Example B is almost twice as great as that for Example C, yet their respective acetylene yields shown by curves 52 and 53 respectively are in a ratio which is the inverse of these blows, while it should be directly as their blows. Evidently, in Example B, much of the blow does not strike the discharge path. In other words, the rim in Example C is evidently wide enough for all of its blow to strike the discharge path, and the greater width of the rim in Example B is useless. Adjusting the blow of Example B by the ratio of the respective blower wheel rims, we obtain the "effective" blow per kwh. for Example B to be:

$$4486\left(\frac{1.06}{3.5}\right) = 1359 \text{ cu. ft. per kwh.}$$

*For the experiments in column 8*

(a) For the operation at the start when the R. P. M. is 2700, we have:

Peripheral velocity of blower in feet per second=235.5.

Total "effective" blow in cubic feet per hour is 78,374.

Rate of energy is 41.28 kw.

Hence the blow per kilowatt is 1898 cu. ft. per kwh.

(b) For the operation at the critical "point" where the R. P. M. is 1050, we have:

Peripheral velocity=91.6 ft. per sec.

Here there is only one peak shown by the oscillograph, and the discharge is stretched only as far as the rim will pull it with a peripheral velocity of 91.6 ft. per sec. and in the time of one half cycle, or 1/120 sec., this "stretch length" is $$\frac{91.6(12)}{120} = 9.16 \text{ inches}$$

Hence the total "effective" blow area is 1.06(9.16) = 9.71 sq. inches

Then the total blow per hour is 17,789 cu. ft. per hour.

The electric energy rate is—

1.6(21.5)(0.67) = 23.05 kw.

The power factor, 0.67, is estimated from the data in the table in column 10 and its relation to the data in this experiment.

Hence the blow per kwh. is—771.3 cu. ft. per kwh.

The temperature in these trials is 250° F. in accordance with statements appearing herein. But all of the gas volumes should be recalculated to obtain their values under one atm. and at 0° C., which conditions are denoted by N. T. P.

The following table presents the values thus obtained.

*Table of gas flows in cubic feet (N. T. P.) per kwh.*

| | |
|---|---|
| For Example B | 937 |
| For Example C | 1,564 |
| For exp. in column 8, at initial R. P. M. | 1,315 |
| For exp. in column 8, at critical R. P. M. | 535 |

It has been impossible for applicant to accurately determine the temperature within the discharge path in operations in accordance with this invention. However, the temperature rise of the gas passing through the discharge is in the neighborhood of 54° F. Thus the rise in temperature may be easily counteracted by continuously cooling a portion of the gas treated and in the production of acetylene it has been found desirable to maintain the temperature within the apparatus in the neighborhood of 250° F.

In Fig. 9 there is illustrated a diagrammatic flow sheet showing apparatus employing two units similar to those shown in Fig. 3. It is to be understood that as many units may be connected in this fashion as is desired and as many as seven such units have been employed. The plurality of casings 15 are mounted in sequence. Feed stock may be introduced into the first casing 15 from the main line through valved connection 54 and a portion of the contents of the box may be continuously withdrawn through conduit 55 and is passed through a cyclone carbon separator 56. Separated carbon is withdrawn at 57. The gas passes from the separator through line 58 into cooler 59 and is withdrawn from the cooler through connection 60. This connection communicates at one end with a circulating blower 61 and intermediate its length has a communicating connection 62 which preferably is valved. A part of the gas from the cooler is circulated through connection 62 into a manifold 63 and passes to the next units in the series in the manner hereinafter more fully explained. The portion of the gas which passes connection 62 is recirculated by a pump 61 into casing 15. For convenience of control the connection 64 between pump 61 and casing 15 is valved.

Referring now to the second unit in the series the casing 15 is connected to manifold 63 by a valved connection 65 and connection 66 leading from pump 67 to the second casing. A valve controlled connection 65' is provided between the main gas line and the second casing 15 to provide additional quantities of untreated gas to the casing when required.

In the second unit of the apparatus the cyclone separator 56, heat exchanger 59 and the accompanying connections are all identical with those just described in conjunction with the first unit. This provides means for constantly circulating a portion of the gas from casing 15 so that it may be cooled and have the carbon separated therefrom and a portion passed to the next succeeding unit, not shown in the drawings, and a part thereof returned to the casing 15 for additional treatment.

In continuous operations involving a plurality of such units, in the casing of the first unit the gas is reacted in such fashion as to maintain a substantially constant concentration of reaction products. This is true in each of the following casings but the concentration in each of the following casings is stepped up. In the casing of the last unit the final concentration is maintained and the line 62 leading from the heat exchanger represents the reaction product withdrawal line. The gas from the last line 62 may be passed through a cloth filter to remove the last traces of carbon and then treated or stored in conventional fashion.

Referring to the modified apparatus shown in Figs. 10 and 11, it will be seen that the apparatus comprises an elongated rectangular tube having two sides 68 and 69 formed of conducting material. The other two sides 70 and 71 are formed of suitable dielectric material such as laminated Bakelite or other synthetics. Side plates 68 and 69 may serve as electrodes directly and are insulated at their ends by insulation material 72. Usually it is preferable to provide separate elongated plate electrodes 73. These electrodes are substantially parallel and are mounted so that the distance between them may be adjusted.

A novel device is provided for initiating and stretching the electric discharge. This device is placed at the entrance of the tube and may be in the form of two sets of discs 74 and 75 mounted upon substantially parallel axes. The discs are rotatably carried by shafts 76 and 77, the ends of which are journaled in copper bellows 78 exterior of the elongated tube. These bellows permit adjustment of the electrodes so that the distance between them at their points of nearest approach may be varied. The bellows contain suitable shaft seals and bearings. The discs of the electrodes are made of conducting material and in the embodiment shown have a diameter of approximately 5" and may be cut from sheet metal No. 16. Adjacent discs upon each shaft are mounted approximately ¼" apart whereby gas may freely flow between them and into the electric discharge space between the electrodes to provide a substantially uniform flow rate throughout the discharge space between both the electrodes 74 and 75 as well as the electrodes 73. It will be seen that there has been provided bare electrode surfaces of substantial area with means for initiating the discharge break-through and means for flowing gas therebetween at a nearly uniform flow rate throughout the discharge space. The initiating means is provided by the diverging portion of the electrode surfaces namely electrodes 74 and 75. Suitable means, not shown in the drawings, are provided for rotating shafts 76 and 77 to turn the discs. The direction of rotation of the discs is such that the points of nearest approach of each set are moved in the direction of flow of gas thereby. Electrodes 74 and 75 have the same polarity as the corresponding electrode 73 and are energized from the same source.

In order to establish a flow of gas through the tube and past and through the electrodes a blower, not shown in the drawings, is connected to the tube and preferably is connected to recirculate the gas past the electrodes. Each of the plate electrodes 73 or alternatively the sides 68 and 69 of the tube are connected electrically with the corresponding set of rotating disc electrodes and are connectible to a suitable source of electric energy.

In operation the gas to be treated is continuously cycled through the tube and repeatedly passes the electrodes. When the apparatus is operated with 60 cycle A. C. controlled by a reactance to give a constant current of 6 amps. and with air moving with different linear velocities the discharge begins between the sets of discs where they are nearest together and moves further upwardly with the flow of gas, thus stretching the discharge to a greater length. Upon reaching the verticle stationary electrodes 73, or the sides 68 and 69 of the tube, as the case may be, the discharge travels upwardly in the tube. The discharge path appears between the latter like an inverted U when viewed from the insulator side of the tube with a suitably operated stroboscope. Depending upon the linear velocity of the gas flow the discharge path will reach the end of a semi-cycle and break either before leaving the discs, or after reaching part way up the verticle side electrodes, or after lingering for a short while at the top end of these verticle side electrodes.

The voltage oscillograms and the ratio of the voltage drop across the electrodes to the rate of flow of gas past the electrodes disclose that the discharge may be an arc or a glow dependent upon the rate of flow of gas past the electrodes as well as the pressure of the gas and the electric discharge energy rate. For example when air was the gas treated with a linear velocity of 80 feet per second and with a constant electric discharge energy rate and gas pressure of one atmosphere an arc was obtained. When the linear gas velocity was increased to 240 feet per second with the other factors remaining constant the glow discharge was obtained. In this operation with the glow discharge nitric acid was produced to such an extent that the gas became opaque. However, the important fact is that the glow discharge was obtained when the relative rate of flow of gas exceeded a critical value.

Some tests of the apparatus were made wherein the discs were allowed to remain stationary and it was found that this did not affect the character of the discharge or the production efficiency per unit of expended electrical energy. This proves that stationary electrodes may be employed to initiate and maintain the glow discharge. Rotation of the discs is preferred in order to evenly distribute the electron bombardment over an appreciable area of the electrode, in the interest of durability of the electrodes.

The apparatus was also operated upon methane wherein only the disc electrodes were energized. These discs serve similarly to the rotary electrodes in the first described apparatus except that the blow or flow of gas is produced from an extraneous source rather than by the impeller electrode. Here again non-rotation of the discs did not affect the operation. However, they were preferably rotated in the interest of durability.

Due to the shape of the apparatus around the discs all of the gas blowing through the elongated tube does not pass through the electric discharge region or path between the discs. For this reason an extra large rate of flow of gas was employed to assure a glow discharge. However, this is introduced to the discharge space along the divergent portions of the electrode surfaces and between the upright electrode. The following table shows results obtained when operating upon methane to produce acetylene:

| Tube Velocity | Average Concentration $C_2H_2$ Percent | Amount Produced Per kwh., C. F. | Total Energy Input kwh./C. F. $CH_4$ |
|---|---|---|---|
| 200' per sec | 2.78 | 2.34 | .0147 |
| 270' per sec | 3.34 | 2.66 | .0123 |

It has been found in the operation of both types of apparatus that the glow discharge may be produced in any gas. It was also found that chemical reactions could be produced in the gas of the type characterized by being initiated by (endothermic) activation of at least one constituent of the gas. For example the treatment of methane produced acetylene and carbon black. Carbon dioxide when treated formed carbon monoxide and oxygen. Air, a mixture of $4N_2$ plus $O_2$, forms NO. $CH_4$ plus $H_2S$ forms $CS_2$. $CH_4$ plus $N_2$ forms HCN. Hydrocarbons heavier than methane, but volatile under the temperature and pressure conditions within the apparatus, when treated, give about 20% higher yield of acetylene per kwh. than does methane. Hydrogen and some ethylene are also produced. Methane, at present, is preferred for making acetylene only because of its relative cheapness as compared to higher hydrocarbons.

A theory has been evolved to explain what takes place in the glow discharge. Applicant does not wish to be bound by this theory and bases all of the claims upon the actual facts observed. However, the theory will be advanced herein in an attempt to clarify or correlate the results that were observed.

In the luminous discharge, whether glow or arc, the relation of the contents of the two spaces within and without the luminous discharge path is determined by the diffusive interchange of gaseous particles. Within the discharge space proper there are energized or activated particles including electrons, ions, radicals, and atoms. All these particles are present because of activation of the molecules of the gas within the discharge space. These newly formed energized particles diffuse into the surrounding space and there unite with one another to give the reaction products.

The extent of activation of the molecules within the discharge increases with the electron temperature which is moderate in glow discharges and is extremely extensive in arcs.

Since the escape of these energized particles from the discharge path is dependent upon the rapidity with which they pass out of this path and is hindered by their accumulation in the space immediately surrounding the discharge path, vigorous blowing of gas through and around the discharge will decrease the energy content of the discharge path even though the electric current to maintain the discharge remains constant. This establishes a new equilibrium between the path content and its surroundings in which the path will contain a lesser concentration of energized particles and hence a lesser conductivity. Therefore an arc discharge with its high energy content may thus be changed to a glow discharge when the conductivity of the discharge path is sufficiently reduced by displacement of a sufficient quantity of those energized or activated particles.

This is borne out by the results heretofore described and especially by the results shown in Figs. 6, 6a and 7, wherein it is shown that by varying the rate of flow of gas through and about the discharge path between the electrodes the discharge may be maintained either as an arc or as a glow dependent upon the rate of flow of gas.

From the foregoing it will be seen that this invention is one well adapted to attain all of the ends and objects hereinabove set forth together with other advantages which are obvious and which are inherent to the structure, and method.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described my invention, I claim:

1. Apparatus for producing a low temperature glow-type spread-out electric discharge in gaseous media within a reaction chamber under pressures of near atmospheric with a high potential gradient between the electrodes comprising substantially cylindrically shaped electrodes mounted for rotation within the chamber, said mountings being such that at any time the surface portions of nearest proximity of opposing electrodes are substantially parallel, one of said electrodes having passages terminating at one end in the arcuate electrode periphery and communicating at their other ends with the reaction chamber at points spaced from and within the electrode periphery and means for rotating said electrodes whereby rotation of the electrodes circulates the gaseous medium within the chamber and continuously blows portions thereof into the discharge space between the electrodes contributing to the attenuation of the electric discharge.

2. Apparatus as in claim 1 wherein all of the electrodes have said peripheral passages.

3. Apparatus as in claim 1 wherein a stationary sheath encases the ineffective portions of the perforated electrode periphery.

4. Apparatus for producing a low temperature glow-type spread out electric discharge in gaseous media within a reaction chamber comprising two spaced apart bare divergent electrodes with surfaces of substantial breadth and length of which at least one is perforated so extensively that gas when blown between the electrodes as well as through the perforations in the direction of divergency passes with nearly the same velocity through all portions of the space between the electrodes, and which electrode faces have points included in a line transverse to the divergency which are substantially equidistant from the points of nearest approach of one to the other electrode surface, and means for varying the distance between the electrodes and also means for blowing gas between the electrodes and through the perforations in the direction of divergency.

5. Apparatus for producing a low temperature glow type spread out electric discharge in gaseous media within a reaction chamber comprising a cylindrically shaped electrode opposed by an electrode with a surface of substantial width and length, and means for varying the distance between the electrodes, the cylindrical electrode being mounted for rotation within the chamber, said mounting being such that at any time the surface portions of nearest proximity of opposing electrodes are substantially parallel, and said electrode having passages terminating at one end in its arcuate electrode periphery, and communicating at their other ends with the reaction chamber at points spaced from and within the electrode periphery, and means for rotating said electrode whereby rotation of the electrode circulates the gaseous medium within the chamber and continuously blows portions thereof into the discharge space between the electrodes thereby contributing to the attenuation of the electric discharge.

6. The method of inducing chemical reactions in hydrocarbon gases by means of electric discharges which consists of initiating and maintaining, within a reaction chamber containing such a gas under a pressure greater than one-tenth of atmosphere and up to a pressure of 250 pounds per square inch gauge, a continuous electric glow discharge between two divergent bare conducting electrodes of which at least one is being moved in the direction of divergency, with an average discharge path length substantially greater than $\frac{3}{16}$ inch and with a current strength greater than 5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres.

7. The method of inducing chemical reactions in hydrocarbon gases by means of electric discharges which consists of initiating and maintaining, within a reaction chamber containing such a gas under a pressure greater than one-tenth of atmosphere and up to a pressure of 250 pounds per square inch gauge, a continuous electric glow discharge between two divergent bare conducting electrodes, with an average discharge path length substantially greater than $\frac{3}{16}$ inch and with a current strength greater than 5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres.

8. The method of inducing chemical reactions in hydrocarbon gases by means of electric discharges which consists of initiating and maintaining, within a reaction chamber containing such a gas under a pressure greater than one-tenth of atmosphere and up to a pressure of 250 pounds per square inch gauge, a continuous electric glow discharge between two bare conducting electrodes, with an average discharge path length substantially greater than $\frac{3}{16}$ inch and with a current strength greater than 5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres.

9. The method of inducing chemical reactions in hydrocarbon gases by means of electric discharges which consists of initiating and maintaining within a reaction chamber containing such a gas under a pressure greater than one-tenth of atmosphere, a continuous electric glow discharge between two divergent bare conducting electrodes of which at least one is being moved in the direction of divergency, with an average discharge path length substantially greater than $\frac{3}{16}$ inch and with a current strength greater than .5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres.

10. The method of inducing chemical reactions in hydrocarbon gases by means of electric discharges which consists of initiating and maintaining within a reaction chamber containing such a gas under a pressure greater than one-tenth of atmosphere, a continuous electric glow discharge between two divergent bare conducting electrodes, with an average discharge path length substantially greater than $\frac{1}{16}$ inch and with a current strength greater than 5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres.

11. The method of inducing chemical reactions in hydrocarbon gases by means of electric discharges which consists of initiating and maintaining within a reaction chamber containing such a gas under a pressure greater than one-tenth of atmosphere, a continuous electric glow discharge between two bare conducting electrodes, with an average discharge path length substantially greater than $\frac{1}{16}$ inch and with a current strength greater than 5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres.

12. The method of inducing chemical reactions in non-explosive gases composed of polyatomic molecules by means of electric discharges which consists of initiating and maintaining within a reaction chamber containing such a gas under a pressure greater than one-tenth of atmosphere and up to a pressure of 250 pounds per square inch gauge, a continuous electric glow discharge between two divergent bare conducting electrodes of which at least one is being moved in the direction of divergency, with an average discharge path length substantially greater than $\frac{1}{16}$ inch and with a current strength greater than 5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres and which flow rate is to be so great that the electric current will exhibit the phenomena characteristic of a glow as herein disclosed.

13. The method of inducing chemical reactions in non-explosive gases composed of polyatomic molecules by means of electric discharges which consists of initiating and maintaining within a reaction chamber containing such a gas under a pressure greater than one-tenth of atmosphere and up to a pressure of 250 pounds per square inch gauge, a continuous electric glow discharge between two divergent bare conducting electrodes, with an average discharge path length substantially greater than $\frac{1}{16}$ inch and with a current strength greater than 5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres and which flow rate is to be so great that the electric current will exhibit the phenomena characteristic of a glow as herein disclosed.

14. The method of inducing chemical reactions in non-explosive gases composed of polyatomic molecules by means of electric discharges which consists of initiating and maintaining within a reaction chamber containing such a gas under a pressure greater than one-tenth of atmosphere and up to a pressure of 250 pounds per square inch gauge, a continuous electric glow discharge between two bare conducting electrodes, with an average discharge path length substantially greater than $\frac{1}{16}$ inch and with a current strength greater than 5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres and which flow rate is to be so great that the electric current will exhibit the phenomena characteristic of a glow as herein disclosed.

15. The method of inducing chemical reactions in non-explosive gases composed of polyatomic molecules by means of electric discharges which consists of initiating and maintaining within a reaction chamber containing such a gas under a pressure greater than one-tenth of atmosphere a continuous electric glow discharge between two divergent bare conducting electrodes of which at least one is being moved in the direction of divergency with an average discharge path length substantially greater than $\frac{1}{16}$ inch and with a current strength greater than 5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres and which flow rate is to be so great that the electric current will exhibit the phenomena characteristic of a glow as herein disclosed.

16. The method of inducing chemical reactions in non-explosive gases composed of polyatomic molecules by means of electric discharges which consists of initiating and maintaining within a reaction chamber containing such a gas under a pressure greater than one-tenth of atmosphere a continuous electric glow discharge between two divergent bare conducting electrodes, with an average discharge path length substantially greater than $\frac{3}{16}$ inch and with a current strength greater than 5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres and which flow rate is to be so great that the electric current will exhibit the phenomena characteristic of a glow as herein disclosed.

17. The method of inducing chemical reactions in non-explosive gases composed of polyatomic molecules by means of electric discharges which consists of initiating and maintaining within a reaction chamber containing such a gas under a pressure greater than one-tenth of atmosphere a continuous electric glow discharge between two bare conducting electrodes, with an average discharge path length substantially greater than $\frac{3}{16}$ inch and with a current strength greater than 5 amperes forming a discharge path of substantially constant luminosity all the way between the electrode faces, simultaneously flowing the gas through the space between the electrodes and through the discharge space at a rate in cubic feet at normal temperature and pressure per kilowatt hour which is greater than the number expressed by $535p^{1.6}$ when $p$ expresses the pressure in atmospheres and which flow rate is to be so great that the electric current will exhibit the phenomena characteristic of a glow as herein disclosed.

EUGENE P. SCHOCH.

References Cited in the file of this patent

UNITED STATES PATENTS

| Number | Name | Date |
|---|---|---|
| 214,481 | Anderson | Apr. 22, 1879 |
| 969,547 | Linder | Sept. 6, 1910 |
| 1,657,758 | Lum | Jan. 31, 1928 |
| 1,887,658 | Nutting et al. | Nov. 15, 1932 |
| 2,074,530 | Baumann et al. | Mar. 23, 1937 |

FOREIGN PATENTS

| Number | Country | Date |
|---|---|---|
| 409,265 | Great Britain | July 18, 1932 |

OTHER REFERENCES

Vosmaer: "Ozone," pp. 34, 54, 55, 56, (1916).

Fan: "Physical Review," vol. 55 (1939), pp. 769–775.